United States Patent Office 3,539,290
Patented Nov. 10, 1970

3,539,290
RECOVERY OF METALS FROM USED HYDRO-CARBON CONVERSION CATALYSTS
Henry Erickson, Park Forest, and Robert L. Foster, Homewood, Ill., assignors to Sinclair Research, Inc., New York, N.Y., a corporation of Delaware
No Drawing. Filed Dec. 6, 1967, Ser. No. 688,341
Int. Cl. C01g 1/06; C22b 23/00
U.S. Cl. 23—87                                    17 Claims

ABSTRACT OF THE DISCLOSURE

A process for the recovery of metal values from spent hydrocarbon conversion catalysts containing metals selected from Groups V–B, VI–B and/or VIII of the Periodic Table or mixtures of such metals, supported on a solid refractory metal oxide base and having iron oxide-containing fines deposited on the surface of the catalyst particles and mixed with the catalyst particles which comprises subjecting the catalyst to a passage of fluid for a time sufficient to cause a substantial amount of the iron oxide-containing fines to be physically removed from the catalyst by the passage of fluid, and subsequently removing selected metal by chemical treatment.

---

This invention is an improvement in a method for the recovery of metal values from spent hydrocarbon conversion catalysts. Increased needs for petroleum products have led to the manufacture and use of prodigious quantities of metal-promoted hydrocarbon conversion and refining catalysts. For example, hydrogenation processes, such as hydrosulfurization, use large amounts of catalysts which contain molybdenum, tungsten or vanadium, and a group VIII metal of atomic number 27 to 28, that is cobalt and/or nickel, supported on a substrate. These catalysts, after considerable use, reach a state where their effectiveness is severely diminished. The catalysts are then discarded from petroleum processing and, at the present time, large amounts of these and other spent catalysts are available on an increasing basis. These catalysts usually are synthetic gel based catalysts, that is, they are made by deposition of nickel or cobalt and molybdenum, tungsten or vanadium from a solution or slurry of salts of these metals on a refractory metal oxide such as alumina, silica, or silica-alumina base or substrate which generally has been precipitated from a solution of salts of silicon and/or aluminum. Also, sometimes the base or substrate may be a clay or acid-treated and/or partially dehydrated clay.

The spent catalysts are frequently rich in valuable materials containing more than about 1 weight percent molybdenum, tungsten or vanadium and greater than about 0.5 wt. percent cobalt or nickel. For example, some popular hydrogenation catalysts contain about 5–10 wt. percent molybdenum and about 1–4 wt. percent cobalt, essentially the balance being alumina. Although referred to as "metals," these metal values may be in the form of free metals or relatively non-volatile metal compounds. It is to be understood that the term "metal" used herein refers to either form. Even though these spent catalysts are richer in these valuable metals than many ores, there has been little success in recovering these metal values.

Various petroleum stocks have been known to contain small amounts of many metals. In addition to metals naturally present, including some iron, petroleum stocks have a tendency to pick up tramp iron from transportation, storage and processing equipment. Tramp iron can also be picked up by the catalyst from the processing equipment in which the catalyst is used. Most of these metals, when present in a stock, deposit in a relatively non-volatile form on the catalyst during the conversion processes so that regeneration of the catalyst to remove coke does not remove these contaminants. Generally, the iron is present in oxide form and is either loosely deposited on the exterior surface of the catalyst or is distributed throughout the catalyst in the form of iron oxide-containing fines. The presence of the iron oxide containing particles is not desirable since they contaminate the metal values recovered from the catalysts.

Residual petroleum stocks contain relatively large amounts of nickel and vanadium and during treatment of these hydrocarbons, e.g. by hydroconversion such as hydrosulfurization or hydrocracking, these metal components deposit on the solid hydroconversion catalysts. The amount of metals so derived may approach or even surpass the promoting metals on the catalyst and thus the recovery of these metals becomes even more important.

The improvement of this invention involves a method for the removal of the undesirable iron oxides from such catalyst prior to treatment of the catalysts for removal and recovery of the contained metals. According to the invention, a fluid such as water or air is passed through the catalyst at such a rate to remove the finely divided iron oxide-containing particles without appreciable loss of the catalyst particles. When the flow of fluid is downward the catalyst can be supported by means capable of containing the catalyst while permittting passage of the undesired finely divided iron oxide-containing particles. Such means can be a grid in the form of a web or belt to allow continuous operation. When the flow of fluid is upward, the undesired finely divided iron oxide-containing particles can be floated by the fluid from the catalyst. Generally, the catalyst is disposed as a bed in a treating vessel and during this treatment it is preferred that the velocity of the upflowing fluid be sufficient to cause an expansion in the volume of the bed as compared to its settled condition. Finely divided iron oxide-containing particles deposited on the surface of the catalyst particles and iron oxide-containing fines intermixed with the catalyst particles are removed by the flow of fluid. The catalyst is then treated, usually by chemical means, for the removal of the contained metals and the contained metals are recovered with substantially less iron contamination.

For recovery of vanadium along with chromium, molybdenum, tungsten, iron, cobalt and/or nickel, treatment of the pretreated catalysts with molecular-oxygen-containing gas at an elevated temperature, followed by high temperature sulfiding of the catalyst, chlorination and an aqueous wash serves to remove most of the heavy metal values from the catalyst and puts these values in a readily recoverable form, whence they may be used for known purposes, including new catalyst manufacture. Repeated treatments may also give a relatively pure alumina which may be used for metallurgical purposes. A final basic wash may be employed for more complete vanadium recovery, or, where only vanadium is to be recovered, this basic wash may be preceded by merely the elevated temperature oxygen gas treatment with or without chlorination. Likewise, where only cobalt and/or nickel recovery is sought, the oxygen treatment may be eliminated and the basic aqueous wash omitted.

The metal removal procedure is not limited to the foregoing steps nor do all of the foregoing steps have to be included in the metal removal procedure. For instance, the catalyst can be treated with a hydrogen-containing gas at an elevated temperature prior to chlorination. The hydrogenaion causes an increase in the removal of cobalt, nickel and iron in subsequent steps over the amount which would be removed had the hydrogenation not been performed.

The molecular oxygen-containing gas treatment can be modified by treating the catalyst with molecular oxygen containing gas in the presence of a promotor such as an oxide of nitrogen. Such a procedure provides for greater vanadium removal when practiced in conjunction with the other metal removal procedures which put the metals into the chloride, sulfate or other volatile, water-dispersible or more available form.

The sulfiding step can be followed by treatment of the sulfided catalyst with a gaseous oxidizing medium or an aqueous oxidizing medium to provide the metal in a form dispersible in an aqueous or basic aqueous wash. This treatment may be used as part of an overall metals-removal procedure employing a plurality of processing steps to remove a significant amount of one or more of the metals.

The sulfiding step can also be followed by treatment of the sulfided catalyst with an acid solvent for the metal sulfide such as an aqueous solution of a mineral acid. After the acid treatment the catalyst can be washed with an aqueous medium to remove remaining soluble or dispersible components.

Following chlorination, the chlorinated catalyst can be washed with an aqueous solution containing a soluble chelating agent. The agent advantageously is an organic carboxylic acid and forms soluble chelate complexes with the metals and effectively retards redeposition of the metals on the catalyst surface once they are brought into solution.

Alternative to the removal of metals by procedures involving contact of the catalyst with aqueous media after chlorination, certain metals such as nickel and some iron may be removed from the catalyst as volatile carbonyls by treatment with carbon monoxide. The CO treatment generally serves both to convert the elemental metal, especially nickel and iron, to volatile carbonyls and to remove the carbonyls which are recovered and processed for their metal values by conventional procedures.

Catalysts used in petroleum processing, containing large amounts of catalytically active metals are known as "promoted" catalysts. The catalyst base is generally of the solid refractory metal oxide type, for instance, silica, alumina, magnesia, titania, etc., or their mixtures. The catalyst bases which have received the widest acceptance today are usually predominantly alumina or silica, that is aluminia- or silica-based, and may contain solid oxide promoters, e.g., magnesia, etc. Molybdenum is a favorite promoting metal, and is generally used in combination with a group VIII promoter, especially those of atomic number 27 and 28, that is cobalt and/or nickel. These heavy metal oxide promoters usually total less than about 35 percent of the catalyst, preferably about 5 to 25 percent. These compositions are generally calcined to a state of very slight hydration before use in processing.

Catalysts are used as particles having a size suitable for the manipulations encountered in their use. Hydrodesulfurization processes are generally performed using a fixed or moving bed of catlyst which generally is macro-sized, that is, in bead or pellet form, perhaps as large as about ½ inch to about 1 inch in length and about ¼ inch in diameter and usually at least $\frac{1}{32}$ inch to about $\frac{1}{16}$ inch in these dimensions. The treating process of this invention can be performed upon catalyst of this particle size or upon catalyst, for instance having particles predominantly in the approximate 20 to 150 micron range, which is disposed as a fluidized bed in the reaction zones to which the reagents are applied continuously in the vapor phase. The catalyst is regenerated to remove carbon by contact with a combustion supporting gas before any metal removal treatment.

In a preferred embodiment, a column is loaded with catalyst and the fluid is passed through the catalyst bed in the column at such a rate whereby there is sufficient expansion of the catalyst bed so as to remove the finely divided iron oxide-containing particles without appreciable loss of the catalyst particles. Finely divided iron oxide-containing particles deposited on the surface of the catalyst particles and iron oxide-containing fines distributed throughout the catalyst bed are removed by the upward flow of fluid through the catalyst bed in the column. If desired, the catalyst can be screened prior to the fluid treatment to remove a portion of the iron oxide-containing fines.

After the fluid treatment, a preliminary treatment of the catalyst at an elevated temperature with molecular oxygen-containing gas and high temperature sulfiding of the catalyst prior to chlorination can improve metals removal. The catalyst can also be treated with hydrogen containing gas as an alternative to oxygen-containing gas and/or sulfiding treatments prior to chlorination to improve metals removal. Chlorination at a moderately elevated temperature can remove large amounts of tungsten, molybdenum and vanadium from a catalyst as volatile chlorides and can convert cobalt and nickel to their water-soluble chloride form.

Treatment of the spent catalyst with molecular oxygen-containing gas can be performed at a temperature generally in the range of about 1050° F. to 1800° F. or more. Little or no effect on vanadium removal is accomplished by treatment below about 1000° F., even for an extended time. Preferably a temperature of about 1200–1400° F. is used and a pressure from atmospheric to about 1000 p.s.i.g., preferably up to about 15 p.s.i.g., is imposed. In general, the oxygen treatment may last for about 24 or more hours, preferably for about 1–6 hours. If any significant amount of carbon is present on the catalyst at the start of this high-temperature treatment, the essential oxygen contact is that continued after carbon removal. In any event, after carbon removal, the oxygen treatment of the essentially carbon-free spent catalyst is at least long enough to provide by conversion or otherwise a substantial amount of vanadium in a high valence state, as evidenced by a significant increase, say at least about 10 percent, preferably at least 100 precent, in the vanadium removal in subsequent stages of the process. The duration of the treatment and the amount of vanadium prepared by the treatment for later removal is dependent on the temperature and characteristics of the equipment used. The length of the treatment may vary from the short time necessary to produce an observable effect to a time just long enough not to be impractical. The oxygen-containing gas used in the treatment contains molecular oxygen as the essential active ingredient. The gas may be oxygen, air, a mixture of oxygen with an inert gas, or oxygen enriched air. The proportion of oxygen in the treating gas may range widely, e.g., from about 2 to 100 mole percent, but generally will be at least about 15 mole percent.

The catalyst can also be treated with molecular oxygen-containing gas under the above conditions in the presence of a promoter such as an oxide of nitrogen. The promoting oxide may be provided, for instance, by premixing the molecular oxygen-containing gas with an oxide of nitrogen such as $N_2O$, $NO$, $N_2O_3$, $N_2O_5$, and mixtures of the same. Preferably $NO_2$ is used, for its ease of manufacture and storage stability. The promoter is generally used in an amount sufficient to provide at least about 0.1 percent of the promoter, by weight of the catalyst, during the effective part of the oxygen treatment. At least about 0.2 percent is preferred and the upper limit of nitrogen oxide promoter content will ordinarily be determined by economic considerations. It usually need be no more than about 1 percent although amounts up to about 10 percent, 20 percent, or even more may be used.

The sulfiding step can be performed by contacting the spent catalyst with elemental sulfur vapors, or more conveniently by contacting the catalyst with a volatile sulfide, such as $H_2S$, $CS_2$ or a mercaptan. The contact with the sulfur-containing vapor can be performed at a pressure from atmospheric to about 1000 p.s.i.g. and an elevated temperature generally in the range of about 500 to 1500 or 1600° F. or more, preferably about 800 to 1300° F. Other treating conditions can include a sulfur-containing vapor partial pressure of about 0.1 to 30 p.s.i.g. or more, preferably about 0.5 to 15 p.s.i.g. Hydrogen sulfide is the preferred sulfiding agent. The sulfiding gas may contain about 10 to 100 mole percent $H_2S$, preferably at least about 80 mole percent $H_2S$. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 24 hours or more depending on the conditions; usually about 1–6 hours is a sufficient time. Temperatures of about 900 to 1200° F. and pressures approximating 1 atmosphere or less seem near optimum for sulfiding, and this treatment often continues for at least 1 or 2 hours but time, of course, can depend upon the manner of contacting the catalyst and sulfiding agent and the nature of the treating system, e.g. batch or continuous, as well as the rate of diffusion of sulfiding agent within the catalyst pore structure.

The sulfiding step provides the catalyst with sulfur-containing metal compound and also appears to concentrate some metals, especially nickel, at the surface of the catalyst particle. The metal sulfide is formed but this sulfide may not necessarily be a simple sulfide of a single metal. Other metal-sulfur compounds also appear to be formed and some of these compounds may be removed from the catalyst during the sulfiding step particularly when the catalyst contains a high level of both nickel and vanadium. After sulfiding, exposure of the catalyst to chlorination or oxidation conditions provides the metal in a form dispersible by an aqueous medium.

Oxodiation can be performed by a gaseous oxidizing agent to provide the metal present in a dispersible form. Some of the metal present may be converted to the sulfate form. The identity of other soluble or otherwise dispersible forms of the metal present has not been established, but the liquid aqueous medium does remove them. Dispersible is intended to include minute particle size material which can pass through an ordinary fritted glass filter, as well as soluble and colloidal size particles. The oxidation preferably takes places immediately after sulfiding, with the catalyst in a substantially anhydrous condition, that is, having no free water, or being at least dry to the touch. Gaseous oxygen or mixture of gaseous oxygen with inert gases such as nitrogen, may be brought into contact with the sulfided catalyst at an oxygen partial pressure of about 0.2 atmosphere and upward and time dependent on oxygen partial pressure. The contacting gas may be at room temperature or above, although usually not above about 1300° F., preferably not above about 1000° F. The actual temperature of contact of the gas with the catalyst, of course, will generally be influenced by the high temperature of the sulfided catalyst when gas contact follows sulfiding immediately. The gas phase oxidation is best carried out at about one atmosphere $O_2$ and at very brief contact times. The oxidizing gas is preferably anhydrous, that is, at ambient temperature, water would not present a separate liquid phase. Contact with the gaseous oxidizing agent is conveniently maintained for about an hour or longer but apparently the major amount of sulfided material is converted to the dispersible form during the first moments of contact.

The sulfided metal poisons may also be converted to dispersible form by a liquid aqueous oxidation medium such as a dilute hydrogen peroxide or hypochlorous acid water solution. Other oxidizing agents, such as sodium peroxide in acid solution, chromic acid and similar aqueous oxidizing solutions such as water solutions of manganates and permanganates, chlorites, chlorates and perchlorates, bromites, bromates and perbromates, iodates and periodates, are also useful. Bromine or iodine water or aerated, ozonated or oxygenated water, with or without acid, also will provide the metals in dispersible form. The inclusion in the liquid aqueous oxidizing medium of sulfuric acid or, preferably, nitric acid has been found greatly to reduce the consumption of peroxide. In addition, the inclusion of nitric acid in the oxidizing solution provides for increased vanadium removal and minimum solution of aluminum in the recovery medium when the catalyst contains alumina as such or in combined form. Useful proportions of acid to peroxide to catalyst generally include about 10 to 25 lbs. acid (on a 100 percent basis) to about 1 to 30 or more lbs. $H_2O_2$ (also on a 100 percent basis) in a very dilute aqueous solution, to about one ton of catalyst. The conditions of oxidation can be selected as desired. The temperature can conveniently range up to about 212° F. with temperatures of above about 150° F. being preferred. Temperatures above about 212° F. necessitate the use of superatmospheric pressures and no need for such has been found.

The use of a water solution of chlorine as an oxidizing medium shows good results in the removal of nickel from the catalyst, especially when chlorine gas is added to the slurry of catalyst in chlorine water during the oxidation treatment. A 30 percent $H_2O_2$ solution in water seems to be a commercially advantageous raw material for preparing the aqueous oxidizing solution. Sodium peroxide or potassium peroxide may be used in place of hydrogen peroxide, and in such circumstances, extra sulfuric or nitric acid is usually provided.

Another highly advantageous oxidizing medium, especially where the catalyst, before sulfiding, has been given a high temperature treatment with molecular oxygen containing gas, is an aerated dilute nitric acid solution in water. Such a solution may be provided by continuously bubbling air into a slurry of the catalyst in very dilute nitric acid. Other oxygen-containing gases may be substituted for air. The time required for oxidation is generally at least about 7 to 8 minutes. The oxidation slurry may contain, for instance, about 20 percent solids and provide about five or ten pounds of nitric acid per ton of catalyst depending on the pH of the water used to make up the medium. Studies have shown a greater concentration of $HNO_3$ to be of no significant advantage.

After providing the metal present in a dispersible form, the catalyst can be washed with a liquid aqueous medium to remove metal compound. This aqueous medium is generally somewhat acidic. Frequently, however, it is desirable to add small amounts of a mineral acid to the wash water especially where untreated water is employed. Useable acids include sulfuric, nitric, and hydrochloric. Ambient temperatures can be used in the wash but temperatures of about 150° F. to the boiling point of water and agitation are helpful in increasing dispersibility. Pressures above atmospheric may be used but the results usually do not justify the additional equipment. Again, short contact times from about two minutes to half an hour are sufficient for metal removal and the aqueous oxidizing solution, if employed, may perform part or all of the metal compound removal simultaneously with the oxidation.

The solvent for the metal sulfide is an aqueous solution of a mineral acid. Acids containing an anion which forms soluble salts with the metal present are suitable for use in water solution to dissolve the metal sulfides from the catalyst and generlly sulfuric, hydrochloric, or nitric acid is used in the form of the free acid or the ammonium salt. The liquid aqueous solution is employed at 32 to 212° F., preferably about 70 to 150° F. Temperatures toward the upper limit of this range are advantageous in increasing solubility. Temperatures above 212° F. require pressurized equipment, the cost of which does not appear to be justified. The time of washing also may vary within wide limits, so long as thorough contact between the catalyst and wash solution is assured. Very short wash times, for example, about a minute, are satisfactory, while the time of washing may last up to about 120 minutes or longer.

Generally the slurry of catalyst in aqueous acid solution will contain about 0.5 to 50 percent acid, preferably about 2 to 10 percent acid, and will contain about 1 to 30 percent catalyst by weight, preferably about 10 to 20 percent. Usually the pH is less than about 2.

After the acid treatment the catalyst can be washed with an aqueous medium to remove remaining soluble or dispersible components, preferably at least until there is substantially no trace of soluble or dispersible metals in the wash effluent. Ambient temperatures can be used but temperatures of about 150° F. to the boiling point of water are helpful in increasing solubility. Pressures above atmospheric may be used but the results usually do not justify the additional equipment.

As an alternative to oxygen-containing gas and sulfiding treatments, the catalyst can be treated with hydrogen-containing gas can take place at a temperature of about 1000–1600° F., preferably about 1200–1400° F., the choice of treating conditions depending upon the extent of metal present and the stability of the catalyst toward high temperatures. The pressure of the hydrogenation system may be from atmospheric pressure or less up to about 1000 p.s.i.g. and preferably up to about 15 p.s.i.g.

The hydrogenating vapor contains about 10 to 100 percent free hydrogen; the rest may be any inert gas such as nitrogen. Preferably the hydrogenating vapor is anhydrous, that is, no separate aqueous phase appears if the vapor is converted to the liquid state. The hydrogenation appears to cause nickel and other metals in the catalyst to come to the surface; the hydrogenation, therefore, is continued for a time sufficient to bring about an increase in the removal of nickel and other metals in subsequent chlorination and washing steps over the amount which would be removed had the hydrogenation not been performed. The treatment may take up to about 24 or more hours, more likely about 1–6 hours.

After sulfiding, the catalyst generally is cooled and then it is chlorinated to convert some of the molybdenum, vanadium and/or tungsten to volatile form and cobalt and nickel to water-dispersible form. The conversion to chloride may use vapor-phase techniques which take place at a moderately elevated temperature of about 300° F. to about 1500° F. or more, preferably about 550 to 700° F., with optimum results being obtained close to about 600° F. In this range, molybdenum, iron, tungsten and vanadium chlorides or oxychlorides vaporize from the catalyst, but not cobalt or nickel chloride. The chlorinating reagent is a vapor which contains chlorine, and can be in combination with carbon or sulfur. The chlorinating agent can be essentially anhydrous, that is, if changed to the liquid state no separate aqueous phase would be observed. As the amount of the water in the chlorinating agent increases, additional time and/or chlorinating agent may be required to obtain a given amount of metal removal. This inhibiting effect is also evident when water is present in the catalyst so that it is preferred that the catalyst contain less than about 1 or 2 percent volatile matter, that is, matter which is removable by heating an inert gas to 1000° C. A pressure of about 0 to 100 or more p.s.i.g., preferably 0–15 p.s.i.g., may be maintained in chlorination, the contacting usually lasting for at least about five minutes, preferably about 15 minutes to an hour, but shorter or longer reaction periods may be possible or needed, for instance, depending on the linear velocity of the chlorinating vapors.

A chlorinating mixture may contain as one component molecular chlorine or hydrogen chloride or their mixture and, as the other component, a vaporizable carbon or sulfur compound of chlorine. Either component may be present as the major constituent of the mixture, but generally the other component is present in an amount sufficient to enhance the chlorination; that is, the conversion to chloride which would be achieved without the presence of the second component, under any given set of conditions.

Also, it has been found that a carbon or sulfur compound component of the mixture may be provided in less amounts when molecular chlorine or HCl is present, while still resulting in substantial effective conversion of molybdenum, tungsten and vanadium to their chlorides at the moderate temperatures of the process. This perhaps is due to regeneration of the covalent compound in situ during the chlorination. Molecular chlorine and HCl are considerably less expensive than carbon tetrachloride or other promoters and thus the chlorinating mixtures are economically attractive.

The carbon compounds which are of value as promoters are advantageously the chlorine substituted light hydrocarbons, such as carbon tetrachloride, which may be used as such, or formed in situ when, for example, a vaporous mixture of chlorine gas with low molecular weight hydrocarbons such as methane, n-pentane, etc. is employed. Useful inorganic sulfur-containing compounds include the volatilizable sulfur chlorides, e.g., sulfur monochloride, $S_2Cl_2$, sulfur dichloride, $SCl_2$, thionylchloride, $SOCl_2$ and sulfuryl chloride, $SO_2Cl_2$. Hydrogen sulfide or other suitably reactive sulfur-containing material may be used with chlorine for in situ generation of the covalent sulfur compound, but the reaction by-products, such as additional HCl formed, may present a waste disposal problem. Sulfur dichloride may be supplied to the chlorination procedure as a liquid and upon vaporization will give a mixture of sulfur monochloride and chlorine. Also, the chlorinating agents may be mixed with another gas such as nitrogen that is inert in this system.

The stoichiometric amount of chlorine required to convert the molybdenum, tungsten, vanadium, cobalt or nickel to be recovered from the catalyst to a chlorinated compound is the minimum amount of total chlorine ordinarily used. However, since the stoichiometric amount of chlorine frequently is small, a much larger amount of chlorine, about 20–100 percent active chlorinating agent based on the weight of the catalyst, is used in the practice of the invention. The promoter, that is, the covalent chlorine compound, is generally used in the amount of about 1–10 or 20 percent or more, preferably about 5–8 percent, based on the weight of the catalyst for good metal removal; however, even if less than this amount is used, a considerable improvement in metal conversion is obtained over that which is possible at the same temperature using chlorine alone. The amount of promoter may vary depending upon the manipulative aspects of the chlorination step, for example, a batch treatment may sometimes require more promoter than a continuous treatment for the same degree of effectiveness and results. The chlorine and promoter may be supplied individually or as a mixture to the spent catalyst or, as pointed out above, as a material suitable for generation of such a mixture in situ. Such a mixture may contain about 0.1 to 50 parts chlorine or HCl per part of promoter, preferably about 1–10 parts per part of promoter. A chlorinating gas comprising about 20–50 weight percent chlorine, based on the catalyst together with one percent or more $S_2Cl_2$ gives good results. Preferably, such a gas provides 30–40 percent $Cl_2$ and about 6 percent $S_2Cl_2$, based on the catalyst. A "saturated" mixture of $CCl_4$ and $Cl_2$ or HCl can be made by bubbling chlorine or hydrogen chloride gas at room temperature through a vessel containing $CCl_4$; such a mixture generally contains about 1 part $CCl_4$; 5–10 parts $Cl_2$ or HCl The chlorination reaction proceeds to convert molybdenum, tungsten and/or vanadium to chloride form and to remove some of the volatile chloride. When the chlorination is performed at a temperature too low to volatilize sufficient of the chloride, the chlorination treatment may be followed, if interrupted, by a purge of the catalyst with an inert gas. The purging usually need be performed at a temperature no higher than about 700° F. The chlorination may take about 5 to 120 minutes, more usually about 20 to 60 minutes, but shorter or longer reaction periods may be possible or needed, for instance, depending on the linear velocity of the chlorinating and purging vapors.

The chlorinator effluent contains molybdenum, tungsten and/or vanadium in chloride form. The chloride may be condensed from the vapors by cooling, for example, by air, and collected in a bag filter. The resulting chloride powder can then be treated for recovery of the metal values by conventional processes, for example, by smelting, electrolytic or other reduction practices. Alternatively, the metal chlorides may be cooled by countercurrent contact with an aqueous alkaline solution in a baffle tower. This solution may be freed from precipitated components by filtration and concentrated for precipitation of metal in catalyst manufacture or recovery of molybdenum, tungsten and vanadium for other uses.

After conversion by chlorination and usually after vaporization of vanadium, tungsten and molybdenum chlorides the catalyst is washed in a liquid aqueous medium to remove metal, for instance cobalt and nickel chlorides, preferably after the catalyst is cooled to avoid the use of excessive pressures to maintain the liquid phase. A pH adjusting component may be employed. A great excess of water can be used, for instance, sufficient to give a slurry containing only minor amounts of solids, say about 2–20 percent. Also, the catalyst should not be allowed to remain in this slurry for too long a time, ordinarily not more than 5 minutes; a residence time of 2–3 minutes in the original wash water is generally preferred.

The water used is sometimes distilled or deionized prior to contact with the chlorinated catalyst. However, the aqueous medium can contain extraneous ingredients in trace amounts, so long as the medium is essentially water and the extraneous ingredients do not interfere unduly with metal removal. Temperatures of about 150° F. to the boiling point of water are helpful in increasing the solubility of the chloride. Temperatures about 212° F. and elevated pressures may be used but the results do not seem to justify the added equipment. Contact with the hot catalyst may be sufficient to raise the temperature of the water from ambient temperature to around the boiling point. The aqueous liquid is preferably acid and a weakly acid condition may be obtained by the chlorides generally present in a chlorinated catalyst which has not been purged too severely. The metal values contained in the aqueous medium may be recovered by well known conventional procedures such as precipitation with metallic zinc or electroplating.

As mentioned, the catalyst may be given a basic aqueous wash after the slightly acidic wash. This wash serves for the removal from the catalyst of available vanadium remaining on it, perhaps due to insufficient purging in the chlorination step. In such a wash, the pH is frequently greater than about 7.5 and the solution can contain ammonium ions, organic-substituted ammonium ions, such as methyl ammonium and quaternary hydrocarbon radical ammoniums, or sodium or potassium ions. The aqueous wash solution can be prepared by addition of a dry reagent or a concentrated solution of the reagent to water, preferably distilled or deionized water. Ammonia or methylamine gas may be dissolved directly in water. Preferred solutions use ammonium hydroxide and have a pH of about 8 to 11.

The amount of ammonia in the solution is sufficient to give the desired vanadium removal and will often be in the range of about 1 to 25 or more pounds per ton of catalyst treated. Five to fifteen pounds is the preferred ammonia range but the use of more than about 10 pounds does not appear to increase vanadium removal unless it increases pH. The temperature of the wash solution may be room temperature or below, or may be higher. Temperatures above 212° F. require pressurized equipment, the cost of which does not appear to be justified. The time of contact also may vary within wide limits, so long as thorough contact between the catalyst and the wash solution is assured. Very short contact times, for example, about a minute, are satisfactory, while the time of washing may last 2 to 5 hours or longer.

Alternative to the removal of metals by procedures involving contact of the catalyst with aqueous media after chlorination, metals such as nickel and some iron may be removed from the catalyst as volatile carbonyls by treatment with carbon monoxide. In such a procedure the catalyst is treated with hydrogen at an elevated temperature during which nickel is reduced to the elemental state, then treated, preferably under elevated pressure and at lower temperature, with carbon monoxide, during which nickel carbonyl is formed and flushed off the catalyst surface. Some iron can also be removed by this carbonylation treatment. Hydrogenation takes place at a temperature of about 800 to 1600° F., at a pressure from atmospheric or less up to about 1000 p.s.i.g. with a vapor containing 10 to 100 percent hydrogen. Preferred conditions are a pressure up to about 15 p.s.i.g. and a temperature of about 1100 to 1300° F. and a hydrogen content greater than about 80 mole percent. The hydrogenation is continued until surface accumulations of metals, particularly nickel, are substantially reduced to the elemental state. Carbonylation takes place at a temperature substantially lower than the hydrogenation, from about ambient temperature to 300° F. maximum and at a pressure up to about 2000 p.s.i.g., with a gas containing about 50–100 mole percent CO, with or without traces of carbonylation promoters such as $H_2S$, $NH_3$, $SO_2$, carbonyl sulfide, hydrogen or iodine to increase the carbonylation reaction rate. The remainder of the carbonylation gas is preferably an inert diluent gas such as nitrogen or carbon dioxide. Preferred conditions include greater than about 90 mole percent CO, a pressure of up to about 800 p.s.i.g. and a temperature of about 100–180° F. The CO treatment generally serves both to convert the elemental metals, especially nickel and iron, to volatile carbonyls and to remove the carbonyls which are recovered and processed for their metal values by conventional procedures.

After metal removal treatment, the catalyst may be sent to waste, or, where a significant amount of metals remain on the catalyst particles, it may be recycled through the metals recovery steps, perhaps mixed with untreated waste catalyst.

The following example will serve to illustrate the present invention.

EXAMPLE

The catalyst used in this invention was a spent cobalt-molybdenum oxide-alumina hydrotreating catalyst. Analysis of the catalyst showed the following composition:

| | Wt. percent |
|---|---|
| Co | 2.80 |
| $MoO_3$ | 13.62 |
| Fe | 0.72 |
| Ni | <0.02 |
| V | 0.013 |
| S | 0.58 |
| Volatile material | 4.39 |

The catalyst was screened, and water washed to remove fines and dried before use. The ⅛ inch particles were charged to a small one-inch Vycor reactor with inert packing to space the catalyst bed in the center of the 12 inch split furnace used to heat the reactor. The spent catalyst was then subjected to either calcination, sulfiding or chlorination, or combinations of these treatments. Three thermocouples in the catalyst bed showed little variation in temperature through the bed. The catalyst charge was generally about thirty grams.

An enlarged section at the top of the reactor trapped metal chlorides volatilized from the catalyst by cooling and by decreasing the velocity of the effluent. This section was designed to prevent solid material from dropping back into the reactor. In most cases the material collected in this section was washed out and the solution analyzed.

The treating chemicals used, such as $H_2S$, $Cl_2$, aqueous ammonia, and $CCl_4$ were all reagent grade. Following treatment in the reactor, the catalyst was cooled, washed and oven dried. The wash solution was analyzed to determine the metals removed in this step.

The volatile matter on the catalyst was determined at 1200° F. The molybdenum was determined gravimetrically by precipitation of the sulfide from solution and the cobalt was analyzed colorimetrically in concentrated hydrochloric acid solution. Alumina was selectively precipitated from solution by base and determined gravimetrically.

The spent catalyst as received contained a considerable amount of fines. It was found that some of these fines could be removed by screening, however, screening of the catalyst followed by upflow water washing of the screened catalyst in a packed column was found to produce the highest degree of fines removal. The fines removed were made up of finely divided iron oxide particles intimately mixed with catalyst particles of various sizes. The catalyst fines were about the same composition as the original catalyst. The amount of fines removed was estimated to be about 2 percent of the catalyst weight. The iron oxide particles were magnetic and appeared to be almost entirely on the outside of the catalyst pills. Table I below summarizes the removal of fines by screening and by screening followed by upflow washing of the screened catalyst in a packed column.

TABLE I.—REMOVAL OF FINES

|  | Base catalyst | Fines | Screened catalyst | Screened and washed catalyst |
|---|---|---|---|---|
|  |  | Run |  |  |
|  |  |  | 84F | 84F | 89E |
| Mo, wt. percent | 9.08 | 7.56 | 8.16 | 8.23 |
| Co, wt. percent | 2.80 | 1.78 | 2.70 | 2.99 |
| Fe, wt. percent | 0.72 | 16.55 | 0.38 | 0.25 |
| $Al_2O_3$, wt. percent | 68.21 |  |  |  |
| Volatile materials, wt. percent | 4.39 |  |  | 11.88 |

The screened and washed catalyst designated in Table I as Run 89E was dried and placed in the reactor and subjected to either calcination, sulfiding, or chlorination or combinations of these treatments. The results of these treatments are summarized in Table II.

Runs 91A and 93C in Table II show that air calcination has relatively little effect on molybdenum removal. This is in contrast to the behavior of vanadium on cracking catalysts where high temperature calcination markedly increases removal. Four hours calcination at 1500° F. were required to bring the vanadium removal up to that obtained for molybdenum with no pretreatment. The high removal of molybdenum indicates mobility of the molybdenum in the catalyst matrix at chlorination temperature.

Runs 93C and 67A in Table II show that the removal of cobalt and molybdenum from the catalyst increased when a promoter was added in the chlorination step.

Runs 93C, 90A, and 67C in Table II show that when the catalyst was sulfided prior to chlorination, a promoter was not needed in the chlorination step to volatilize the molybdenum and thus eliminated the need for a costly reagent in the process. These data indicate that an economical method after fines removal is simply sulfiding with $H_2S$ and then treating with chlorine. The molybdenum was collected from the overhead and the cobalt from the water wash of the catalyst as shown in Run 67C.

TABLE II.—RECLAIMING OF COBALT AND MOLYBDENUM FROM SPENT HYDROTREATING CATALYST

|  | Run |  |  |  |  |  |  |  |  |
|---|---|---|---|---|---|---|---|---|---|
|  | 89E | 91A | 93C | 90A |  | 67A |  | 67C |  |
| Calcination (air): |  |  |  |  |  |  |  |  |  |
| Temperature °F | (¹) | 1,300 |  |  |  |  |  |  |  |
| Time (hrs.) | (¹) | 2 |  |  |  |  |  |  |  |
| Sulfiding ($H_2S$): |  |  |  |  |  |  |  |  |  |
| Temperature °F | (¹) |  |  | 1,300 |  |  |  | 1,200 |  |
| Time (hrs.) | (¹) |  |  | 2 |  |  |  | 2 |  |
| Chlorination: |  |  |  |  |  |  |  |  |  |
| Reagent | (¹) | $Cl_2$, $CCl_4$ | $Cl_2$, $CCl_4$ | $Cl_2$ |  | $Cl_2$ |  | $Cl_2$ |  |
| Temperature °F | (¹) | 650 | 600 | 550 |  | 900 |  | 600 |  |
| Time (hrs.) | (¹) | 1.25 | 3 | 2 |  | 1 |  | 1.5 |  |
|  |  |  |  | Wash |  | Wash |  | Wash |  |
|  |  |  |  | 1st | 2d | 1st | 2d | 1st | 2d |
| Wash: |  |  |  |  |  |  |  |  |  |
| Reagent | $H_2O$ | $H_2O$ | $H_2O$ | $H_2O$ | $H_2O$ | $H_2O$ | $NH_3$ | $H_2O$ | $NH_3$ |
| Percent reagent |  |  |  |  |  |  | 19 |  | 36 |
| Percent slurry |  | 13 | 17 | 17 | 17 | 15 | 15 | 15 | 9 |
| Time (min.) | 20 | 20 | 15 | 15 | 120 | 15 | 15 | 15 | 15 |
| Catalyst analysis, percent: |  |  |  |  |  |  |  |  |  |
| Co | 2.99 | 2.74 | 2.65 |  | 0.94 | 2.47 | 2.60 | 1.12 | 1.02 |
| $MoO_3$ | 12.34 | 4.06 | 4.22 |  | 5.77 | 11.3 | 7.79 | 1.83 | 1.56 |
| Fe | 0.25 | 0.182 | 0.02 |  | 0.091 |  |  |  |  |
| Volatile material | 11.88 | 5.26 | 5.03 |  | 2.43 | 3.25 | 3.72 | 1.89 | 4.66 |
| Percent metals removed: |  |  |  |  |  |  |  |  |  |
| Co | 0 | 25 | 30 |  | 76 | 27 | 26 | 73 | 74 |
| Mo | 2 | 73 | 73 |  | 65 | 19 | 46 | 89 | 90 |
| Fe | 62 | 40 | 95 |  | 64 |  |  |  |  |
| Overhead removal, percent: |  |  |  |  |  |  |  |  |  |
| Co |  | ≪1 |  | <1 |  |  |  |  |  |
| Mo |  | 41 |  | 42 |  |  |  | 71 |  |
| Al (diff.) |  |  |  | <1 |  |  |  | 7 |  |
|  |  |  | Percentages | Cumulative |  |  |  |  |  |
| Wash removal, percent: |  |  |  |  |  |  |  |  |  |
| Co |  | 27 | 45 | 77 | 92 | 12 |  | 69 |  |
| Mo |  | <1 | <1 |  |  | 8 | 38 | <0.1 | <1 |
| Al |  | 2 | 5 | 6 | 7 | <1 |  | 5 |  |

¹ Screened.

It is claimed:
1. A process for the recovery of the metal content from used, iron oxide-contaminated, solid metal oxide supported hydrocarbon conversion catalysts wherein the recoverable metal content is present as vanadium, cobalt, nickel, a Group VI–B metal or mixtures thereof comprising:
  regenerating the catalyst with a combustion supporting gas at an elevated temperature to remove carbonaceous material thereon;
  subjecting the catalyst to a passage of fluid through said catalyst for a time sufficient thereby to cause a substantial amount of the iron oxide-containing particles thereof to be removed from the catalyst by the passage of fluid;
  subjecting the catalyst to an oxidation medium to convert the recoverable metal content to a dispersible form; and
  removing recoverable metal from the catalyst.

2. The process according to claim 1 wherein the metal removal is accomplished by chlorination of the catalyst by contact at above about 300° F. with an essentially anhydrous chlorinating vapor, recovering metal from the effluent chlorinating vapor, and washing the catalyst with a liquid, essentially aqueous medium to remove metal from the catalyst.

3. The process of claim 1 wherein the fluid is water.
4. The process of claim 1 wherein the fluid is air.
5. The process of claim 2 wherein the chlorinating is performed at a temperature of about 550 to 700° F. and the chlorinating vapor is a mixture of chlorine and carbon tetrachloride.

6. The process of claim 2 including sulfiding the catalyst by contact with a sulfiding vapor at a temperature of at least 800° F. after said fluid passage and prior to chlorination.

7. The process of claim 6 wherein sulfiding is performed at a temperature of about 800 to 1500° F. and the sulfiding vapor is $H_2S$.

8. The process of claim 1 wherein the passage of fluid is upwardly through a bed of microsize catalyst at a velocity sufficient to expand the bed.

9. The process of claim 8 wherein the catalyst is a synthetic alumina-gel based catalyst.

10. A process for the recovery of the metal content from used, iron oxide-contaminated, solid metal oxide supported hydrocarbon conversion catalyst where the recoverable metal content comprises cobalt or nickel or mixtures thereof comprising:
  regenerating the catalyst with a combustion-supporting gas at an elevated temperature to remove carbonaceous material thereon;
  subjecting the catalyst to a passage of fluid through said catalyst for a time sufficient thereby to cause a substantial amount of the iron oxide-containing particles thereof to be removed from the catalyst by the passage of fluid;
  sulfiding the catalyst by contract with a sulfiding vapor at a temperature of at least about 800° F.;
  chlorinating the catalyst by contact at least about 300° F. with an essentially anhydrous chlorinating vapor to convert the metal content to chloride form; and
  thereafter washing the catalyst with a liquid, essentially aqueous medium to remove said metal content from the catalyst.

11. The process of claim 10 wherein the fluid is water.
12. The process of claim 11 wherein the fluid is air.
13. The process of claim 11 wherein the sulfiding is performed at a temperature of about 800 to 1500° F. and the sulfiding vapor is $H_2S$.

14. A process for the recovery of metal content from used, iron-oxide-contaminated, solid metal oxide supported hydrocarbon conversion catalyst wherein the recoverable metal content comprises vanadium or molybdenum or mixtures thereof comprising:
  regenerating the catalyst with a combustion supporting gas at an elevated temperature to remove carbonaceous material thereon;
  subjecting the catalyst to a passage of fluid through said catalyst for a time sufficient thereby to cause a substantial amount of the iron oxide-containing particles thereof to be removed from the catalyst by the passage of fluid;
  subjecting the catalyst to an oxidation medium to convert recoverable metal content to a dispersible form; and
  washing the catalyst with a liquid, essentially aqueous medium containing ammonium ions to remove said metal content.

15. The process according to claim 14 wherein the catalyst is treated before washing by chlorination at least about 300° F. with an essentially anhydrous chlorinating vapor.

16. The process of claim 14 wherein the fluid is water.
17. The process of claim 14 wherein the fluid is air.

References Cited
UNITED STATES PATENTS

| | | | |
|---|---|---|---|
| 1,923,095 | 8/1933 | Jenness | 75—112 |
| 2,647,820 | 8/1953 | Forward | 75—119 XR |
| 2,711,957 | 6/1955 | Schaufelberger | 75—119 |
| 2,726,151 | 12/1955 | Kern | 75—119 XR |
| 2,853,374 | 9/1958 | Schaufelberger | 75—119 XR |
| 2,913,335 | 11/1959 | Dean | 75—119 XR |
| 2,945,757 | 7/1960 | Hoekstra | 75—101 XR |
| 3,021,209 | 2/1962 | Murray et al. | 75—112 XR |
| 3,053,614 | 9/1962 | Foos et al. | 75—101 XR |
| 3,088,803 | 5/1963 | Mackin et al. | 75—119 XR |
| 3,088,820 | 5/1963 | Mackin et al. | 75—119 XR |
| 3,117,860 | 1/1964 | Bjerkerud et al. | 75—101 XR |
| 3,224,874 | 12/1965 | Daugherty | 75—119 XR |

EDWARD STERN, Primary Examiner

U.S. Cl. X.R.

23—20, 134; 75—101, 112, 119; 252—415

UNITED STATES PATENT OFFICE
CERTIFICATE OF CORRECTION

Patent No. 3539290             Dated November 10, 1970

Inventor(s) Henry Erickson et al.

It is certified that error appears in the above-identified patent and that said Letters Patent are hereby corrected as shown below:

Column 5, line 21, after "but" insert --the--.

Column 5, line 64, before "water" insert --the--.

Column 7, line 22, after "gas" insert --. Treatment of the catalyst with hydrogen-containing gas--.

Column 13, line 58, change "oontract" to --contact--.

Claim 12, line 1, change "11" to --10--.

Claim 13, line 1, change "11" to --10--.

Signed and sealed this 15th day of June 1971.

(SEAL)
Attest:

EDWARD M. FLETCHER, JR.          WILLIAM E. SCHUYLER, JR.
Attesting Officer                Commissioner of Patents